United States Patent [19]

McCulloch et al.

[11] Patent Number: 4,689,968
[45] Date of Patent: Sep. 1, 1987

[54] ACTUATOR MEANS FOR THE CONTROL OF A REFRIGERATION SYSTEM EXPANSION VALVE

[75] Inventors: Robert M. McCulloch, Broager; Ove Jorgensen, Sonderborg, both of Denmark

[73] Assignee: Danfoss A/S, Nordborg, Denmark

[21] Appl. No.: 842,539

[22] Filed: Mar. 21, 1986

[51] Int. Cl.$^4$ ............................................. F25B 49/00
[52] U.S. Cl. ...................................... 62/225; 62/212
[58] Field of Search ................. 62/204, 205, 206, 210, 62/211, 212, 222, 223, 224, 225, 158; 251/11; 236/92 B, 68 C

[56] References Cited

U.S. PATENT DOCUMENTS

| 3,101,432 | 8/1963 | Adams | 62/158 X |
| 3,537,272 | 11/1970 | Hales et al. | 62/223 X |
| 4,347,976 | 9/1982 | Jakobson | 251/11 |
| 4,475,686 | 10/1984 | Huelle et al. | 236/68 C |

Primary Examiner—Harry Tanner
Attorney, Agent, or Firm—Wayne B. Easton

[57] ABSTRACT

The invention relates to a valve assembly for a refrigeration system of the modulating kind used for controlling the flow of refrigerant through the evaporator. The difference between the inlet and outlet temperatures of the evaporator is utilized to control the superheat but the evaporator inlet temperature taken alone is utilized to set different ranges for the valve actuator temperature to accomodate different operating conditions.

5 Claims, 11 Drawing Figures

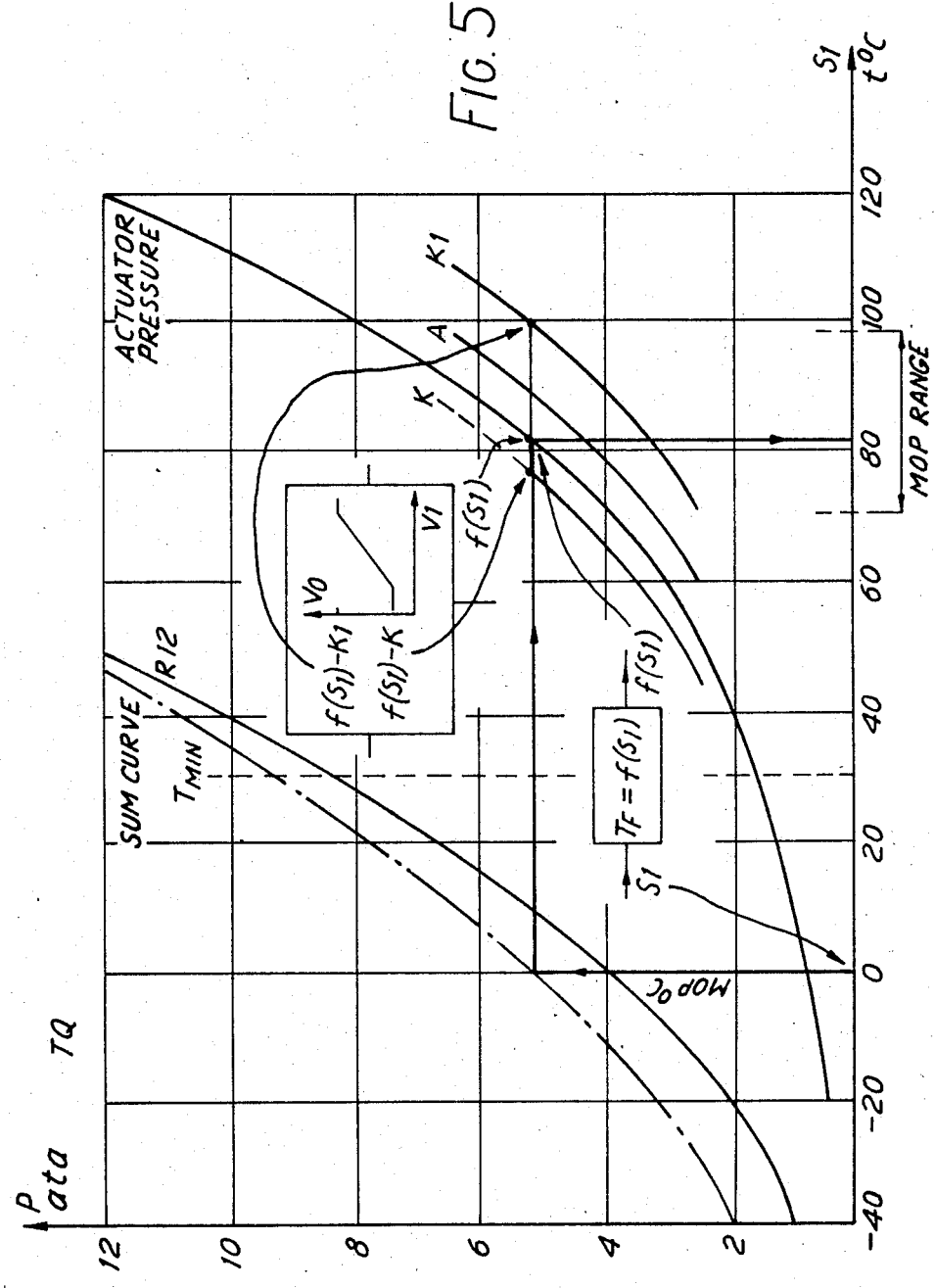

ACTUATOR MEANS FOR THE CONTROL OF A REFRIGERATION SYSTEM EXPANSION VALVE

The invention relates to actuator means for the control of an expansion valve of a refrigeration system.

The invention relates generally to the control of an expansion valve unit of the type utilized to supply fluid refrigerant to an evaporator. The valve unit is further of a type operated by an electrically heated pressure medium filler having a fluid and a gas phase which acts against the force of a spring and the pressure of the refrigerant fluid being controlled by the valve. In this valve the operating temperature of the pressure medium filler is above the temperature of the refrigerant and is controlled pursuant to the deviation of the actual degree of superheat from a reference value. A reference value for the temperature of the pressure medium filler is compared with a feedback actual temperature value and in dependence on a resulting temperature deviation controls the heat energy delivered to the actuator means.

Valve actuator means of the above type is disclosed in U.S. Pat. No. 4,475,686 wherein the control deviation between the desired superheat and the temperature difference across the evaporator is directed to a regulator and there is provided an outer control loop between the valve actuator and the valve position. An internal shorter control loop which controls the temperature of the actuator is achieved by feeding the error signal over the regulator to one input of a comparator as a reference value and connecting the pressure medium temperature sensor to the other input of the comparator as an acutal value sensor. The output signal of the comparator then controls the heat supply over a P-regulator.

The temperature difference signal ($S_2-S_1$) between the input and output of the evaporator is used for measuring the degree of the superheat. It is unfortunate that the temperature difference $S_2-S_1$ may sometimes be close to or equal to zero for two different reasons:
(a) When the evaporator is almost completely full, the superheat will be close to zero and the valve will have an open position for the satisfaction of this condition.
(b) If the valve for some reason is closed, there will be no flow in the system and the temperatures $S_1$ and $S_2$ will approximate the same value. Consequently, also in this case the temperature difference ($S_2-S_1$) would be close to zero.

The regulator cannot distinguish between these two conditions. In condition (a) the presence of even a small error signal will have a tendency to close the valve and thus such signal by itself can cause a departure from condition (a). In condition (b) the natural consequence for the regulator would be to close the valve because the small indicated amount of superheat would tend to cause the valve to close instead of open as would be required for this condition. Under condition (b) the valve would tend to latch up and the system would have to be reset or possibly even interrupted to reestablish control. Condition (b) may be undesireably caused by an increased evaporator pressure, when using back pressure regulation at the output of the evaporator, or when the evaporator is influenced by the pressure from another evaporator connected in parallel to the system.

In the above known system the dynamic range for the actuator temperature $T_F$ is approximately +30° to 140° C. This range is desireable so that one valve model may be used for different types of evaporators and different evaporating temperatures in the range from −70° to +10° C. Disadvantages of this control are that the resetting time after a change of the load by other types of disturbances is long and, more serious, the problem of the latch up condition as mentioned above caused by the large dynamic area.

An object of the invention is a new and improved control principle by which the above mentioned disadvantages are avoided and by which a better control of the operating point of the actuator is achieved. A further object is to achieve a limitation of the dynamic range and thereby achieve a reasonably accurate and rapid control.

In accordance with the invention the above disadvantages are avoided by utilizing the temperature sensor at the evaporator input side to determine a start reference value for the actuator temperature which corresponds to the opening pressure of the actuator. The reference value is subsequently increased by the development of a superheat error signal to a value corresponding to the control deviation.

A feature of the invention is that the temperature at the evaporator input determines a working point on the pressure/temperature curve of the actuator medium so that a pressure is achieved which is equal to the opening pressure of the valve, this being determined by the oppositely acting refrigerant pressure plus the spring force.

Another feature is that when the refrigerating system is started the compressor is preferably switched on with a predetermined delay. When the voltage supply is connected to the system the actuator will heat up to the opening pressure of the valve. By delaying the switching on of the compressor the initially caused pressure change will cause an opening of the valve whereby the temperature at the sensor at the inlet of the evaporator drops and the superheat signal is achieved. In this way a sort of bleed function at the start is achieved.

Another feature involves adapting the signal from the evaporator input temperature to the characteristics of the expansion medium of the actuator. Compensation for the difference between the curves of different refrigerant media is achieved so that the actuator temperature is set proportional to the inlet evaporator temperature.

In a preferred embodiment the superheat error signal from the regulator is connected to a limiter circuit which upwardly and downwardly determines the dynamic working range. The maximum and minimum values are chosen so that their difference is slightly larger than the actual dynamic range to ensure that the valve, despite varying evaporator pressures, in fact is able to fully open and close. The evaporator pressure increases during opening of the valve and accordingly the temperature of the pressure medium of the actuator has to increase to the maximum temperature limit so that the valve can fully open. The dynamic range for the actuator temperature is thus in the range in which the actuator is able to move the valve from closed to a fully open position. To ensure that the valve actually closes, the actuator temperature is allowed to drop a few degrees (e.g. 2° C.) under the closing temperature.

The dynamic range is displaced in parallel along the actuator curve in dependence on the inlet temperature of the evaporator at its inlet temperature sensor. The risk hereby exists that the saturation temperature at the suction side of the evaporator will become too high and consequently overload the compressor which will thereby have a correspondingly high suction pressure.

A feature of the invention relating to avoiding damage to the compressor involves a limiter function for the operating temperatures or the actuator which is preferably arranged in an inner regulation loop. In this respect the limiter could be arranged in the temperature feedback connection of the actuator.

Another feature is that the temperature of the actuator expansion medium is preferably registered by a sensor such as an NTC register which is in thermal contact with the medium and is electrically arranged in a voltage divider, the tapping of which is connected to an input of a comparator which compares it with a reference signal. The comparator, when the set maximum temperature exceeds the reference value, gives an output signal which creates a limitation of the current directed to the actuator heater.

Other objects of the invention will become apparent from the following specification, drawings and claims.

In the drawings:

FIGS. 4 to 7 are prior art diagrams showing operating characteristics and attributes of electronic thermostatic expansion valve and actuator units;

Figure 1:
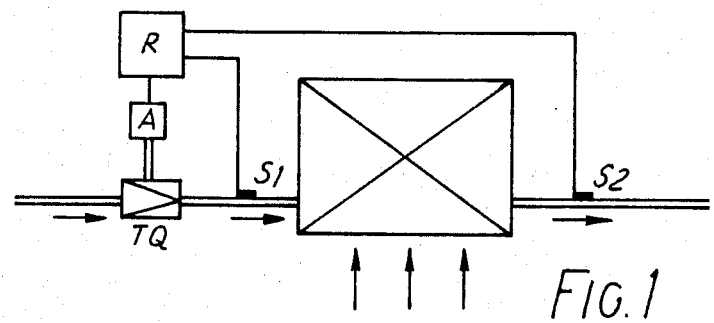
FIG. 1 shows an electronic thermostatic expansion valve system for controlling the flow of refrigerant to an evaporator.

FIG. 1 of Huelle, U.S. Pat. No. 4,475,686 shows a thermostatic expansion valve in a refrigeration system and a control unit for the valve. A thermostatic expansion valve is used in the refrigerant flow control of evaporators and the operation of the valve is to maintain a constant degree of suction superheat at the evaporator outlet under all system loading conditions. It is this type of valve and system to which the control principles of the invention pertains and the Huelle patent is incorporated herein by way of reference instead of reproducing the disclosure thereof.

Figure 2:
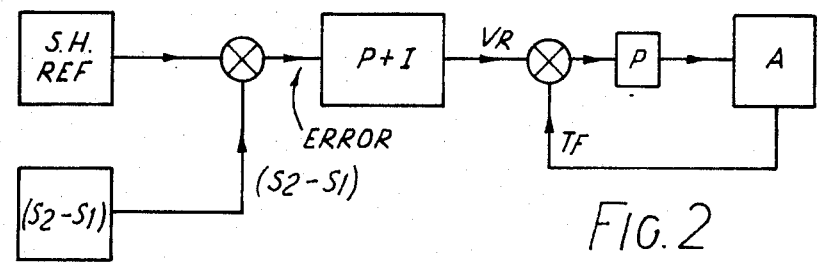
FIG. 2 is a diagramatic showing of an electronic thermostatic expansion valve in accordance with the invention.

FIGS. 1 and 2 herein show a schematic representation of the control system of Huelle, U.S. Pat. No. 4,475,686. In FIG. 1 an electronic regulator R measures the inlet evaporator temperature via sensor $S_1$ and the outlet evaporator superheated gas temperature via sensor $S_2$. The differential signal ($S_2-S_1$) is the degree of superheat, neglecting pressure drop, from the location of $S_1$ to the location of $S_2$. This signal is used to regulate the flow into the evaporator by regulating the opening position of the valve TQ. Thus a desired degree of superheat is obtained by this form of regulation. In FIG. 2 the superheat temperature differential ($S_2-S_1$) is compared with a superheat reference value and the resulting error signal is connected to a proportional and integral (P+I) amplifier. The corresponding signal $V_R$ at the output of the (P+I) amplifier is used as a reference to a control loop for regulating the temperature of the actuator A. The actuator temperature determines the open position of the associated thermostatic expansion valve (not shown) and thereby the refrigerant flow to the evaporator (not shown).

Figure 3:
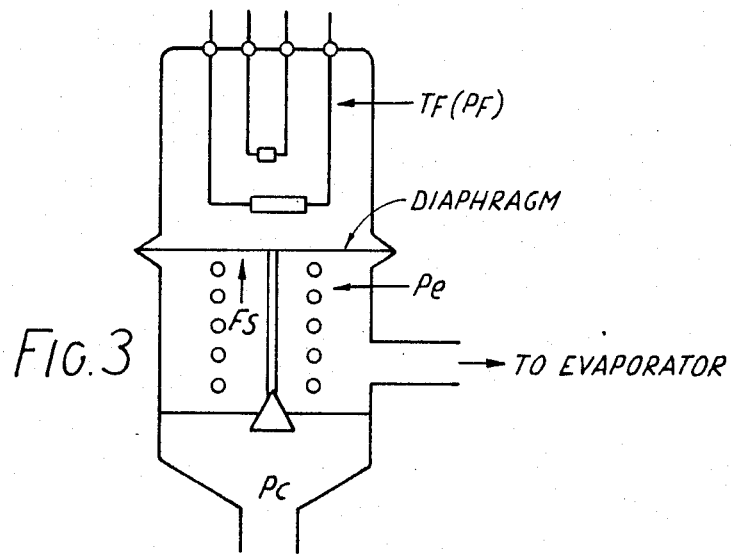
FIG. 3 is a diagramatic showing of a prior art electronic thermostatic expansion valve unit including a valve actuator.

In the combination actuator and valve shown in FIG. 3 the charge chamber is heated by the PTC resistor which receives the power signals from the regulator. The temperature of the charge $T_F$ gives a corresponding charge pressure $P_F$ which acts as a force on the diaphragm. Forces from evaporating pressure $P_e$ and spring force $F_s$ act on the other side of the diaphragm.

The diaphragm finds a position of equilibrium which satisfies the relationship.

$$P_F = F_s + P_e$$

Keeping in mind the construction and operation of the system shown in FIG. 1 of the Huelle patent, it is shown in FIGS. 4 to 7 how the valve opening point for a certain $t_e$ of a prior art evaporator is found.

Figure 4:
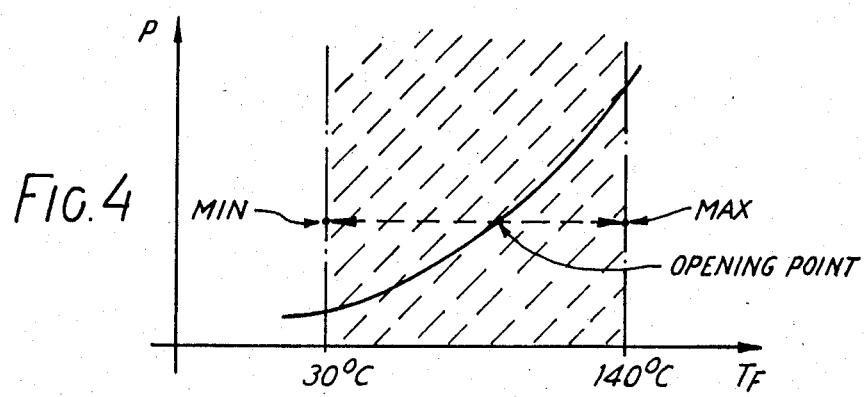

Referring first to FIG. 4, a disadvantage of this prior art form of regulation is that the settling time after a change in load or other forms of disturbance is long. A more serious problem caused by the dynamic range is "latch-up", as mentioned above. Under condition (b) above the actuator temperature $T_F$ decreases to the minimum value of the dynamic range, causing the valve to remain closed permanently.

A so-called sum curve for a refrigeration medium such as R12 is shown if FIG. 5 which shows the resulting pressure for the actuator spring in FIG. 3 plus the refrigerant pressure as a function of the temperature of the refrigerant at the evaporator inlet. This "resulting" pressure constitutes the pressure which must be produced by the actuator in order to open the valve. From the curve in FIG. 5 the corresponding actuator heating temperature can be found which in this instance is approximately 82° C. A start operating point $t = f(S_1)$ is thus achieved from which the actuator temperature and the operating pressure respectively is increased to open the valve in dependence on the actual degree of superheat compared with the set reference value. This is achieved by a circuit schematically shown in FIG. 8.

Figure 6:
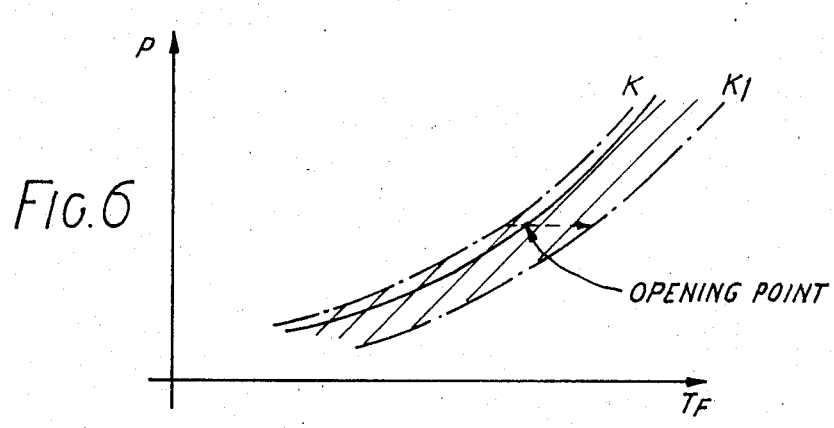
Figure 7:
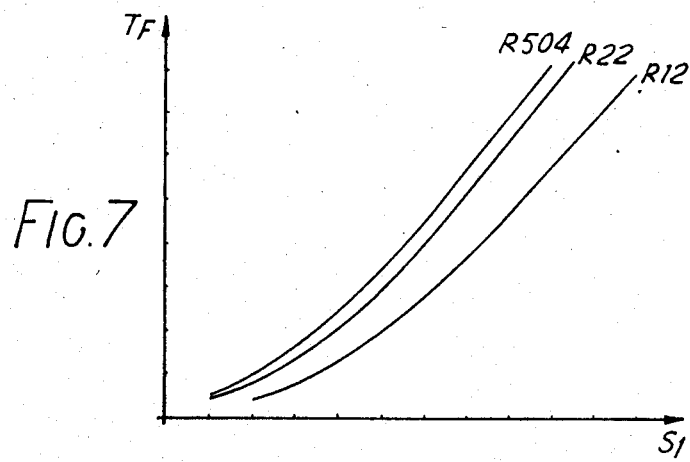

Referring first to FIGS. 6 and 7, however, a prior art solution to the problems was to try to limit the dynamic range of the actuator temperature, at the same time covering the necessary range of evaporator temperatures in the different applications. The desired solution is shown in FIG. 6 in which the dynamic range of the actuator temperature $T_F$ depends on the opening position of the valve, the dynamic range being the same for each opening point.

The minimum and maximum limits are chosen from the following considerations:

(i) The minimum limit is the point at which the valve is defined as being closed. It lies approximately 2° C. from the temperature $T_F$ point where the valve is supposed to open. This limit is called the K limit.

(ii) The maximum limit is the extent of the necessary working range of the TQ value. This is called the $K_1$ limit.

Thus, if temperature $S_1$ is known, the corresponding actuator temperature $T_F$ can be found from the graph in FIG 7.

Figure 8:
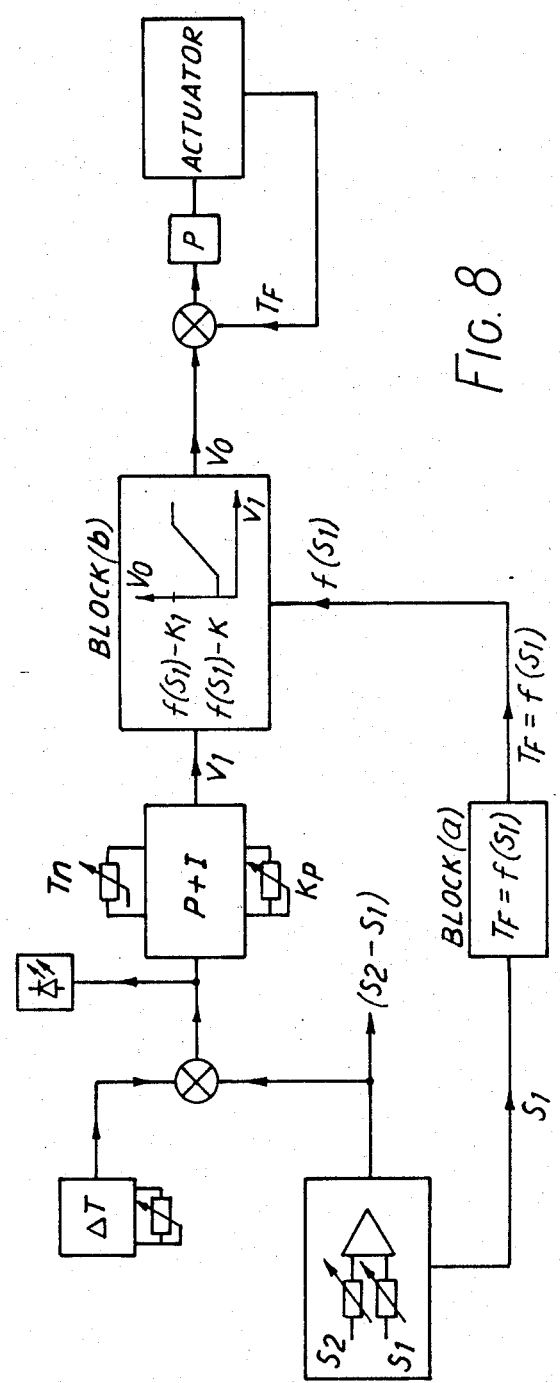
FIG. 8 is schematic diagram of the actuator regulation system part of the invention applied a prior art electronic expansion valve unit.

In the regulator the $S_1/T_F$ characteristic can be "built-in" and using the $S_1$ signal the equivalent actuator temperature $T_F$ can be found. From the calculated values of $T_F$, K and $K_1$, limits can be placed on the actuator temperatures reference sigal $V_R$. FIG. 8 shows the diagram of the regulator which may embody this principle.

The graphs shown in FIG. 7 can be "built-into" the regulator so that the measured $S_1$ signal can be converted to an equivalent actuator temperature, $T_F$. From this value, the limits K and $K_1$ can be placed on the actuator temperature reference signal $V_R$ so that the dynamic range of the actuator temperature is $(K-K_1)°$ C. FIG. 8 shows how this is achieved.

The generated $T_F=f(S_1)$ from block (a) is used to create the limits $(f(S_1)+K_1)$ and $(f(S_1)-K)$ in block (b) such that the voltage $V_R$ is kept within these limits, irrespective of whether the input $V_1$ is not within these limits. Hence, the latch-up problem is avoided in this version.

The sum curves in FIG. 5 also illustrate how signal $S_1$ generates the limits of the dynamic range.

Referring now to FIG. 8 in which sensors $S_1$ and $S_2$ are arranged in accordance with FIG. 1, a difference value signal $(S_2-S_1)$ is compared with a reference value $\Delta T$. The difference (the error) between the difference signal and the reference value is fed to a PI-regulator the output signal of which is fed to a limiter circuit block (b) which will be explained in more detail with reference to FIGS. 9 to 11 herein. The signal V1 from the PI-regulator determines the operating point on the regulator curve outside the starting point (opening point).

In FIG. 8 it is also shown that the signal from one sensor ($S_1$) over an adaption circuit, schematically shown as block (a), is connected to the limiter-circuit block (b) for determining the starting operating point (opening point). The output signal from the control block (b) is fed to a comparator as a reference value $V_R$ to operate the valve actuator.

Figure 9:
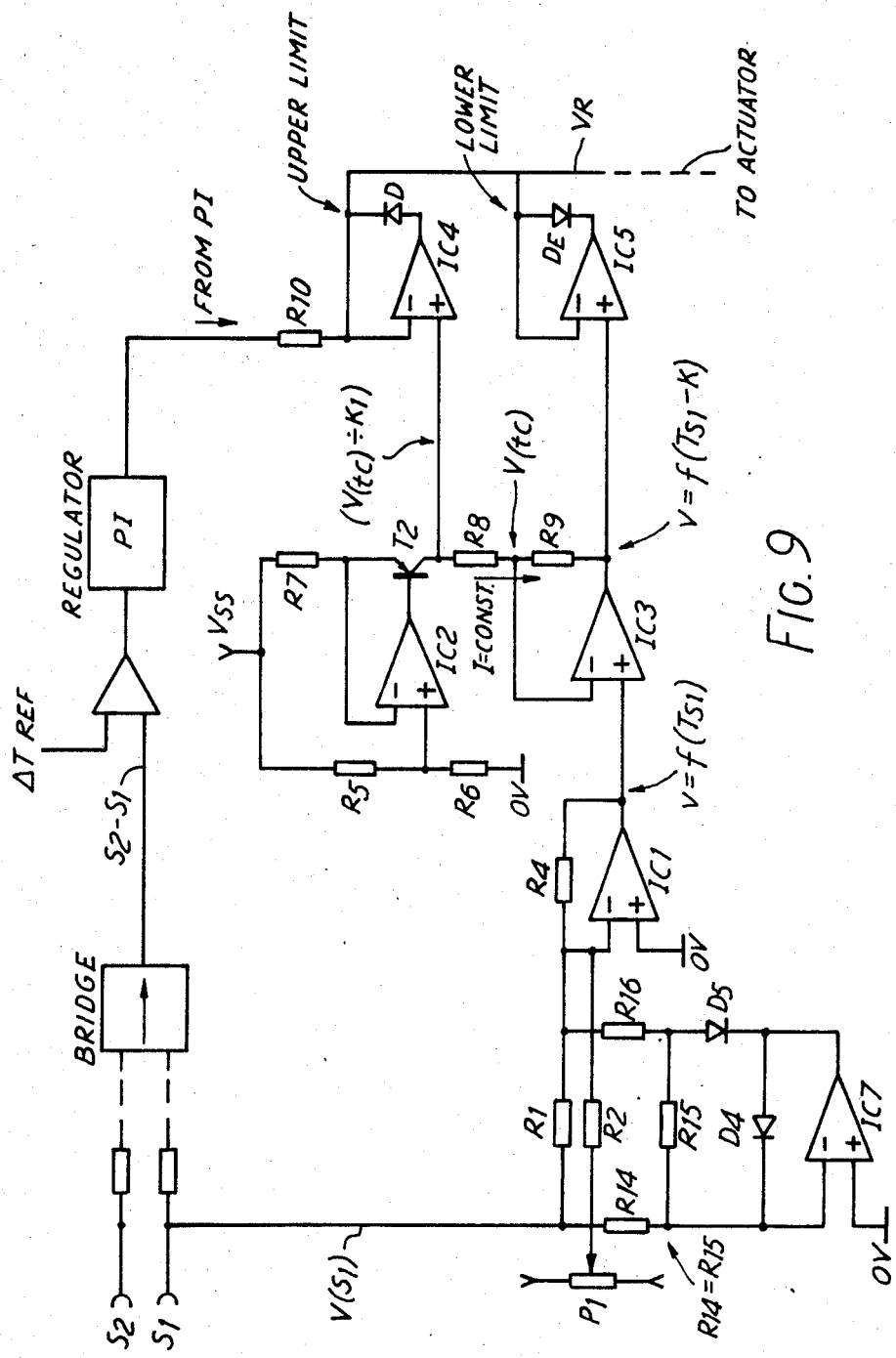
FIGS. 9 to 11 are specific showings in accordance with the invention herein of the circuitry of the actuator regulation system of FIG. 8.

In FIG. 9 the control circuit according to block (b) and the adaption circuit according to block (a) are shown in more detail. The signal from sensor $S_1$ is over a resistor R1 connected to the inverting input of a comparator IC1, the other input of which is connected to ground potential. A negative feedback is established from the output of this comparator over resistor R4 to the negative input terminal. The correct adaption may be adjusted by a voltage from potentiometer P to the negative input of comparator IC1.

Parallel to resistor R1 a nonlinear circuit is connected over resistors R14, R16, diode D4 and diode D5. A differential amplifier IC7 is, with its inverting input, connected to resistor 14 and the cathode of diode D4 and, with its noninverting input, is connected to ground potential. The anode of diode D4 and the cathode of diode D5 is connected to the output of this amplifier.

At the output of the amplifier IC1 a voltage $V=f(T_{S1})$ is obtained which is a function of the temperature at sensor $S_1$ at the entrance of the evaporator and facilitates the setting of a lower operating temperature of the actuator for developing a pressure which is close to the opening pressure of the expansion valve. The output voltage of amplifier IC1 is delivered to a circuit which includes IC2, IC3 and T2 for determining the upper and lower limits for the output voltage $V_R$ controlling the actuator. A constant current generator constituting the components IC2 and transistor T2 delivers a current to a series connection of two resistors R8 and R9, the resistor R8 being connected to the collector of transistor T2 and resistor R9 being connected to the output of comparator IC3 which receives at its noninverting input the signal $V=f(T_{S1})$ from the adaption circuit. The inverting input of comparator IC3 is connected to a point between the two resistors R8 and R9 where, consequently, the same voltage appears as at the positive input of the comparator IC3. At the output of comparator IC3 a voltage $V=f(T_{S1})-K$ which, when compared with the voltage $V=f(T_{S1})$ between the resistors R8 and R9, is reduced by a certain value K corresponding to the voltage drop over resistor R9. At the upper end of resistor R8, which is connected to transistor T2, an increased voltage $V=f(T_{S1})+K'$ is obtained where K' corresponds to the voltage drop over resistor R8. These two limiter values are connected respectively to the noninverting inputs of amplifiers IC4 and IC5. The outputs of amplifier IC4 and IC5 are connected to the line bearing the actuator control voltage $V_R$ over diodes D1 and D2, the diodes being mutually reverse poled. The inverting inputs of the two amplifiers IC4 and IC5 are connected to the line bearing the actuator control voltage $V_R$ which over a resistor R10 constitutes the output of the PI-regulator controlled by the superheat error signal.

Figure 10:
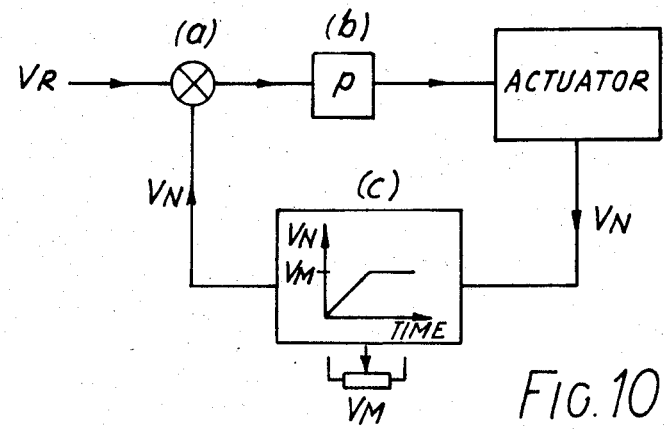
Figure 11:
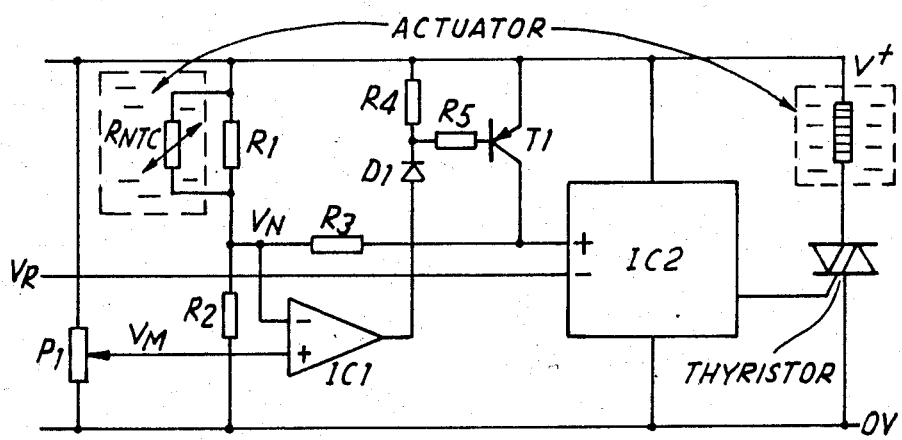

The actuator control circuit is shown in principle in FIG. 10 and in detail in FIG. 11. In FIGS. 10 and 11 $V_R$ is the reference set value for the inner loop, $V_N$ is the voltage equivalent of the actuator temperature measured by the NTC resistor in the actuator medium, and $V_M$ is the maximum set value of $V_N$.

The control voltage $V_R$ is expressive of the needed temperature in the actuator to achieve an acutating pressure and a certain degree of opening of the refrigeration expansion valve. The above mentioned upper and lower limits determine merely an operating range, however, not the absolute temperature of the actuator medium. In order to overload the compressor a sort of maximum operating pressure (MOP) control is achieved in arranging an adjustable higher limit for the actuator operating temperature. The control voltage $V_R$ is supplied to the negative input of a comparator IC2 controlling a thyristor which activates a heater in the actuator medium. The achieved opening temperature is compared with the control voltage $V_R$ in supplying a corresponding voltage to the positive input of the comparator. Further, a second comparator IC1 compares the actuator temperature with a maximum value reference $V_M$ set on a potentiometer P1, and the comparator IC1 activates in case of overtemperature a transistor T1, thereby making the control voltage of the positive input terminal of the heat control comparator IC2 more positive.

Another main feature of the invention is the establishment of a maximum temperature limitation which is an improvement over Huelle's system (U.S. Pat. No. 4,475,686). In FIG. 6 of Huelle the upper left circuit ($A_1$, $B_1$) is a PI controller which senses the superheat and delivers a heater temperature reference signal over $R_{24}$ to amplifier $A_3$ to operate heater $R_{28}$. An actual heater temperature signal is provided from bridge $B_2$ and amplifier $A_2$. The signal from $A_1$ in Huelle corresponds to signal $V_R$ in FIGS. 9 and 11 herein. In the actuator diagram of FIG. 11 herein a large signal on the positive entrance of the controller IC2 results in less heating in the actuator which consequently closes the valve. A high signal $V_R$ corresponding to a high superheating signal may result in a closing of the valve, and this signal is fed to the negative input of the controller IC2.

The operation is as follows:

The NTC resistor which measures the actuator temperature is connected to resistors $R_1$ and $R_2$. This combination produces the voltage $V_N$ which is proportional to the actuator temperature $T_F$. This part of the complete circuit is the feedback part of the inner loop which controls the actuator temperature $T_F$.

The voltage $V_N$ is compared with reference voltage $V_R$ and the necessary effect is supplied by the driver circuit IC2 to the actuator to maintain $V_N$ at the same level as $V_R$.

An extra circuit consisting of potentiometer $P_1$, comparator IC1, diode $D_1$, resistor $R_4$ and transistor $T_1$ is used to limit the voltage $V_N$ to a variable set value of $V_M$, irrespective if the $V_R$ value is higher than $V_M$. This limit circuit is placed in the feedback part of the inner loop.

If the reference voltage $V_R$ is set to a value where $V_R > V_M$, the actuator temperature increases and the corresponding voltage $V_N$ will eventually reach the set limit value $V_M$. At this point, the output of the comparator IC1 will change from high to low level and transistor $T_1$ via $R_4$ and $D_1$ will be switched on. The voltage at the positive input of the driver circuit IC2 will effectively be at the same level as the supply voltage. At this input level, the comparator input exceeds the specified threshold voltage and the output heating effect to the actuator is inhibited by the "fail safe" function of IC2. Thus the actuator temperature and the voltage $V_N$ decreases until the comparator IC1 goes from low to high (when $V_N = V_M$). The heating effect is subsequently restored to the actuator leading to an increase in actuator temperature. The voltage $V_N$ will eventually be the same as $V_M$ and the procedure described above is repeated as long as $V_R > V_M$.

Resistor $R_3$ is used to prevent the NTC resistor from being loaded. It also introduces hysteresis to the comparator IC1. This hystereses is beneficial to the limit circuit, because the amount which $V_N$ varies about the limit value $V_M$ when $V_N$ is limited, can be set. This is done by choosing the value of resistor $R_3$ which gives the desired hysteresis $\Delta V_N$ where $$\Delta V_N =$$

$$R_2 \left[ \frac{\frac{1}{R_1} + \frac{1}{R_{ntc}} + \frac{1}{R_3}}{1 + \frac{R_2}{R_1} + \frac{R_2}{R_{ntc}} + \frac{R_2}{R_3}} - \frac{\frac{1}{R_1} + \frac{1}{R_{ntc}}}{1 + \frac{R_2}{R_1} + \frac{R_2}{R_{ntc}}} \right] V^+.$$

We claim:

1. A regulating system for a refrigeration installation of the type having a compressor, condenser and an evaporator arranged in series and first and second electrical temperature sensors at the inlet and outlet ends of the evaporator, the first sensor being positioned to respond to the temperature of a liquid refrigerant expanded to suction pressure and the second sensor being positioned to respond to suction line sensible temperature, said regulating system, comprising, thermostatic valve means for controlling the flow of refrigerant to said evaporator having an actuator chamber filled with a refrigerant medium having liquid and vapor phases, an electrical heat supply element in said actuator chamber, an electrical feedback in said actuator chamber, control means connected to said sensors and said elements for generating a superheat error signal for controlling the temperature of said refrigerant medium, and means for utilizing said first sensor to determine a reference start value for said valve means corresponding to the opening pressure of said refrigerant medium in said actuator chamber.

2. A regulating system according to claim 1 including means for utilizing said first sensor to determine a working point on the pressure/temperature curve of said refrigerant medium to obtain a pressure equal to the opening pressure of said valve means.

3. A regulating system according to claim 1 including means for adapting the signal from said first sensor to compensate for different characteristics of different kinds of said refrigerant medium for said actuator chamber.

4. A regulating system according to claim 1 including a limiter circuit for utilizing the superheat error signal for determining a dynamic working range for said valve means.

5. A regulating system according to claim 1 including means for limiting the operating temperature of said valve means formed in a feedback loop.

* * * * *